United States Patent [19]

Frantz

[11] Patent Number: 4,766,925
[45] Date of Patent: Aug. 30, 1988

[54] DUMP VALVE ASSEMBLY

[75] Inventor: Virgil L. Frantz, Salem, Va.

[73] Assignee: Roanoke College, Salem, Va.

[21] Appl. No.: 63,454

[22] Filed: Jun. 17, 1987

[51] Int. Cl.[4] .................... E03B 7/10; F16L 55/07
[52] U.S. Cl. .................... 137/62; 123/41.5; 237/80
[58] Field of Search ............ 105/62.1, 62.2; 123/41.14, 41.15; 137/59, 61, 62, 334; 237/80

[56] References Cited

U.S. PATENT DOCUMENTS

| | | | |
|---|---|---|---|
| 1,028,808 | 6/1912 | Campbell | 137/62 |
| 2,032,670 | 3/1936 | Simmen | 123/41.14 |
| 2,408,183 | 9/1946 | Wood | 123/41.14 |
| 2,597,061 | 5/1952 | Burich | 123/41.14 |
| 2,688,460 | 9/1954 | Borgerd | 137/62 |
| 2,887,126 | 5/1959 | Frantz | 137/625.27 |
| 3,621,907 | 11/1971 | Ephraim, Jr. | 123/41.14 |
| 4,065,096 | 12/1977 | Frantz et al. | 251/129.1 |
| 4,126,108 | 11/1978 | Christensen | 123/41.14 |
| 4,231,384 | 11/1980 | Christensen | 137/62 |
| 4,232,696 | 11/1980 | Burris et al. | 137/62 |

Primary Examiner—George L. Walton
Attorney, Agent, or Firm—Wilmer Mechlin

[57] ABSTRACT

Dump valve assembly for a cooling system in which the coolant is water without antifreeze, the system having a compressed air-operated dump valve supplied with operating air from a special reservoir charged through a check valve with compressed air from an associated compressed air system and, under emergency conditions when the associated compressed air system is shut down, automatically operating the dump valve by discharging compressed air thereto under control of a temperature responsive solenoid-actuated valve.

8 Claims, 3 Drawing Sheets

DUMP VALVE ASSEMBLY

BACKGROUND OF THE INVENTION

A cooling system using as a coolant water without antifreeze, such as the conventional system of a diesel locomotive, functions effectively in warm weather and while the locomotive's engine is running but must be dumped whenever the engine unexpectedly, unintentionally or accidentally shuts down and the ambient air temperature is approaching freezing, to prevent damage to the cooling system and the engine. Compressed air-operated dump valves for dumping the water coolant of such a system, were introduced around 1970 but, because manually controlled, were not practical for dumping the coolant in an emergency, as when an engine of a single locomotive or locomotive consist unexpectedly or unintentionally shut down.

A proposed solution for the problem was the dual-winding solenoid-actuated dump valve of Frantz et al patent U.S. Pat. No. 4,065,096, issued Dec. 27, 1977. As opposed to a conventional single-winding solenoid whose power output was inadequate to open a dump valve, the solenoid of the above patent, with separate high and low power windings, ordinarily could both open the dump valve against a considerable hydraulic head and a retaining spring and hold it open until the water coolant was completely drained. A difficulty with the valve of the Frantz patent as an emergency dump valve was that it was not reliable in operation under all service conditions.

The concern of the present invention is an improvement on prior dump valves which is fully automatic in operation and effective to dump from a cooling system a water coolant containing no antifreeze whenever an emergency arises.

SUMMARY OF THE INVENTION

The primary object of the present invention is to provide an improved dump valve assembly for a cooling system using as a coolant water without antifreeze, the assembly combining an air-operated dump valve with a precharged discrete reservoir that operates the dump valve under emergency conditions when an associated compressed air system is shut down by discharging automatically to the dump valve under control of a temperature responsive solenoid-actuated valve.

Another object of the invention is to provide a dump valve assembly whereof an air-operated dump valve is supplied operating air from a reservoir individual to it and precharged by connection through a check valve to an associated compressed air system.

An additional object of the invention is to provide an improved dump valve assembly whereof a reservoir mounts a solenoid-actuated valve controlling its discharge, the valve in turn being controlled by a normally open thermostat in its supply line, the thermostat being mounted on and exposed to water in a dump valve and responsive in closing to a predetermined temperature of the water and/or ambient air.

A further object of the invention is to provide a dump valve assembly whereof a reservoir mounts a solenoid-actuated valve controlling its discharge, and in turn controlled by a normally open thermostat in its supply line, the thermostat being mounted on and exposed to water in a dump valve and responsive in closing to a predetermined temperature of the water and/or ambient air, and wherein the reservoir supplies compressed air on demand to the dump valve through a swivel fitting in the mounting of the solenoid valve on the reservoir.

The foregoing and other objects and advantages of the invention will appear hereafter in the detailed description, be particularly pointed out in the appended claims and be illustrated in the accompanying drawings, in which:

FIGURE DESCRIPTION

DETAILED DESCRIPTION

Figure 1:
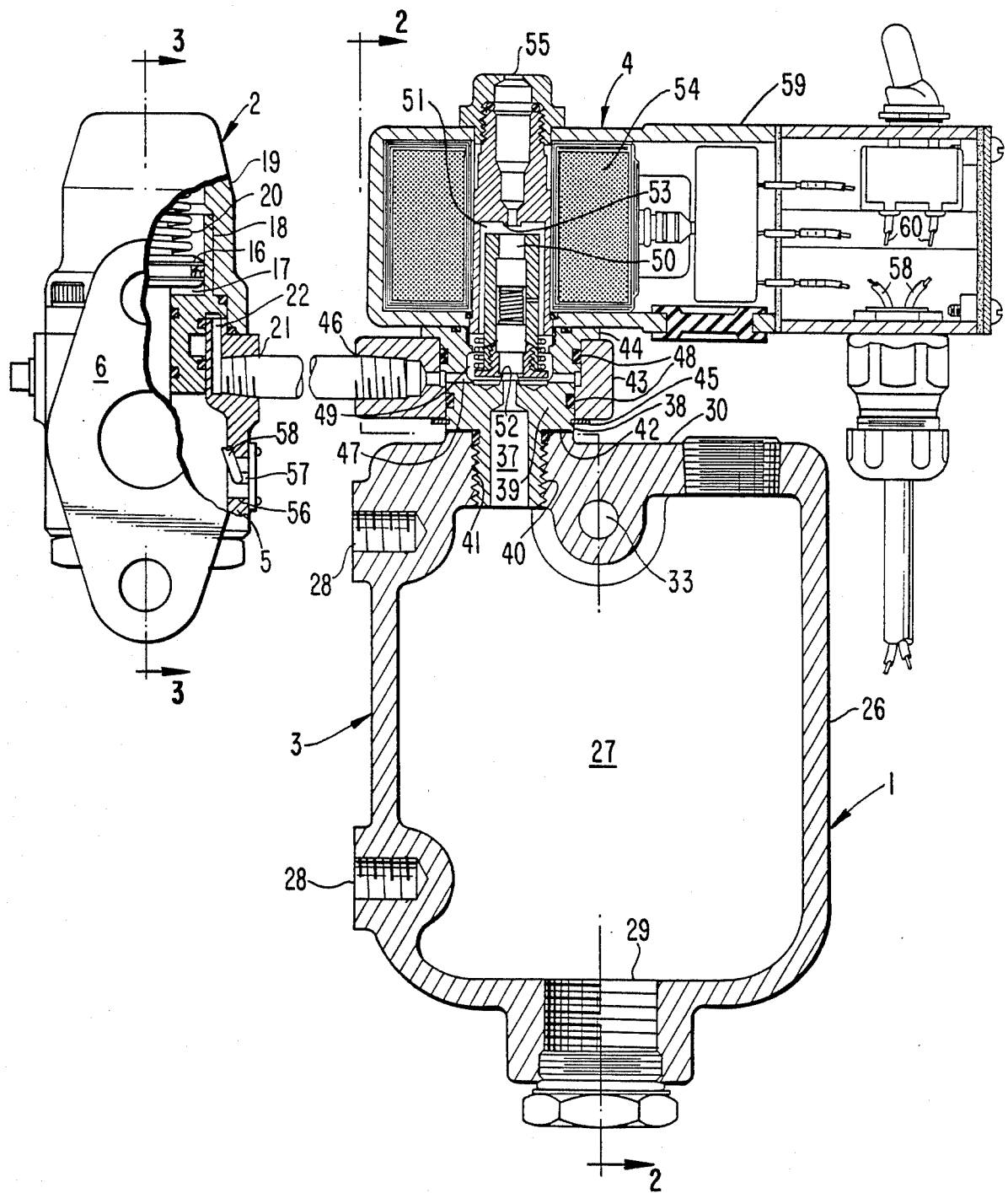
FIG. 1 is a central vertical sectional view of a preferred embodiment of the dump valve assembly of the present invention, with the dump valve shown partly in end elevation.
Figure 2:
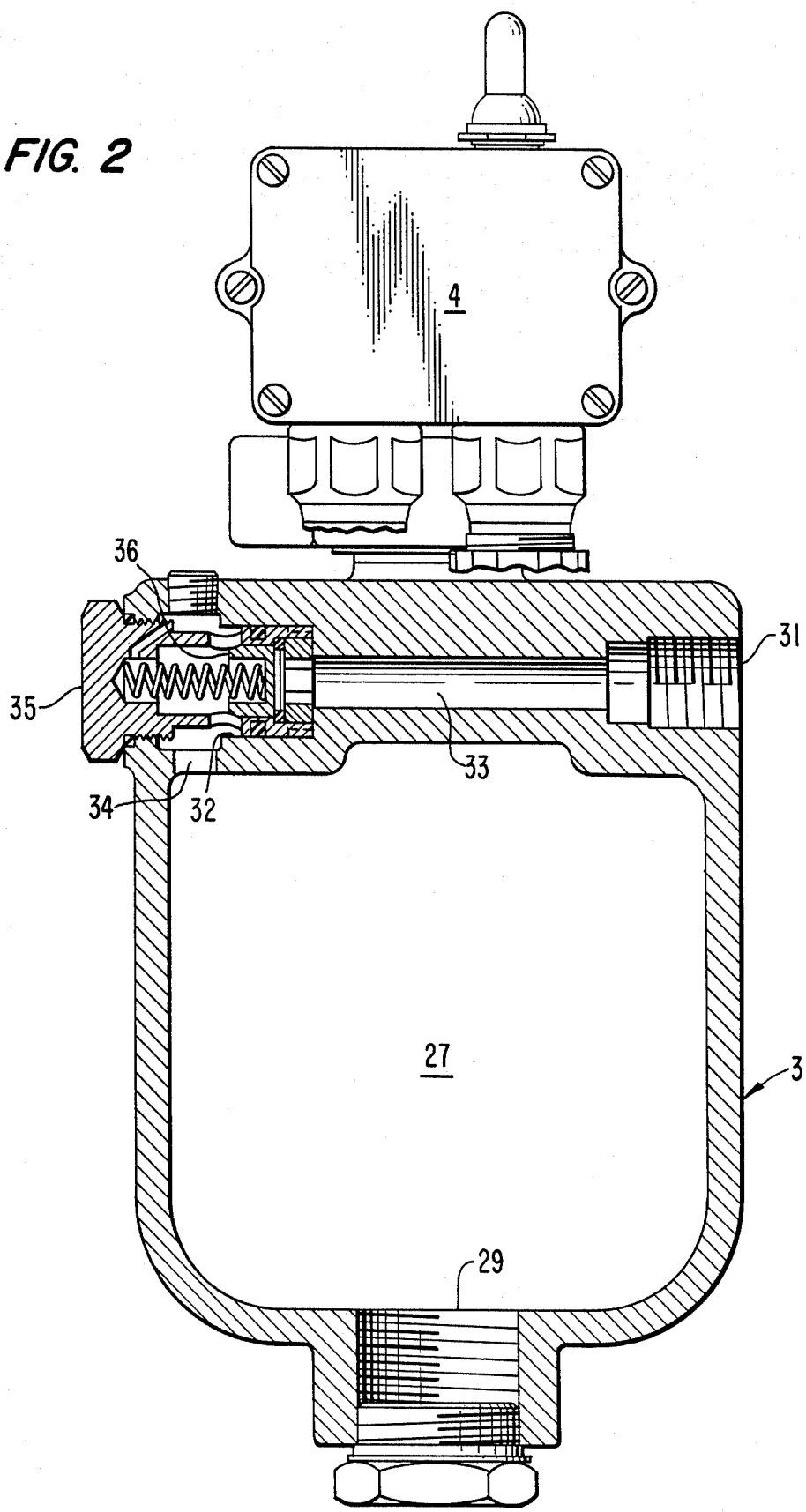
FIG. 2 is a view, partly in section and on a somewhat larger scale, taken along lines 2—2 of FIG. 1.
Figure 3:
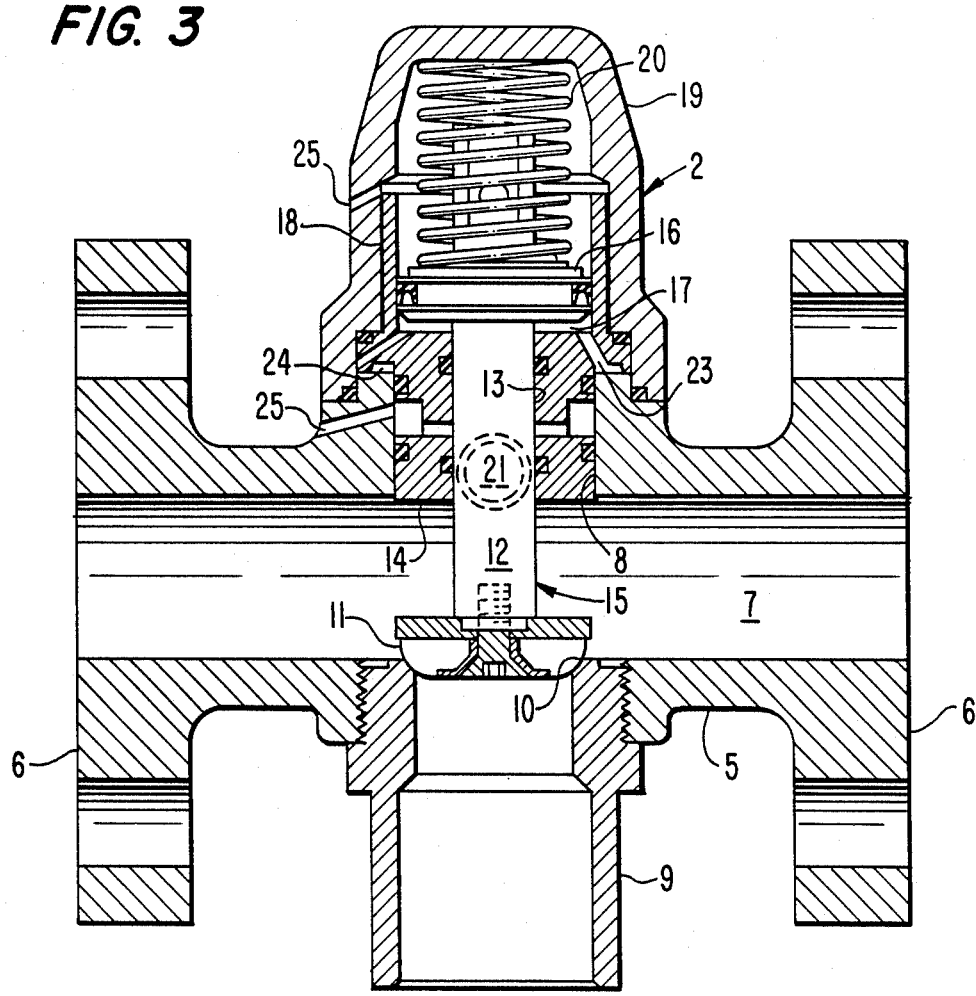
FIG. 3 is a vertical sectional view on an enlarged scale taken along lines 3—3 of FIG. 1.
Figure 4:
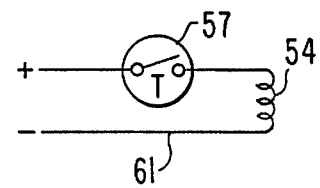
FIG. 4 is a wiring diagram of a power circuit of the solenoid-actuated valve.

Referring now in detail to the drawings in which like reference characters designate like parts, the improved dump valve assembly of the present invention, while available for dumping liquid from piping of a cooling or other liquid system by a compressed air-operated dump valve, is particularly designed for use under emergency conditions in automatically dumping by such a dump valve a water coolant from the cooling system of a diesel locomotive when an engine of the locomotive unexpectedly shuts down while exposed to near freezing weather, and will be so described as exemplary of a preferred embodiment of the invention.

As usual in diesel locomotives, the water coolant in the cooling system is without or contains no antifreeze and, as such, is sometimes hereafter referred to as "plain" or "antifreezeless" water.

Designated as 1, the assembly of the illustrated embodiment is comprised of a dump valve 2 operable by compressed air, a reservoir 3 discrete, individual, separate or specific to the dump valve for supplying the latter in emergencies with operating compressed air and a solenoid-actuated valve 4 for controlling discharge of air from the reservoir to the dump valve. Here a component in the combination of the present assembly 1, the dump valve 2 was first marketed around 1970 for use in diesel locomotives but was not then suitable for use as an emergency dump valve because dependent for supply of operating air upon the operation of an associated compressed air system 13.

The previous incapability of the dump valve 2 as an emergency valve is avoided in the assembly 1 by providing the valve with its own, discrete, individual or separate source of compressed air in the reservoir 3, which, in the manner hereafter to be described, is charged from a locomotive's compressed air system while the locomotive is running and, when the locomotive is shut down, holds, stores or retains its charge for discharge on demand in emergencies to the dump valve in sufficient volume for the dump valve to drain the plain water from the locomotive's cooling system.

Connected at a low point in the piping (not shown) of a diesel locomotive cooling system, the dump valve 2 of the exemplary assembly 1 is comprised of a body 5 having for connection in the piping, end flanges 6 at opposite ends of a suitably horizontal longitudinal or axial bore 7 for normally passing water circulating in the system. A vertical transverse or cross-bore 8 in the body 5 centrally intersects or interrupts the axial or main bore 7. For intermittently or periodically dumping or draining water from the cooling system, the body, for a dump or drain port, may be fitted with a downwardly opening stub dump tube 9 conveniently screwed into the lower end of the cross-bore 8 and having at its upper end at or below the level of the main bore 7 a valve seat 10 normally closed by a poppet valve or valve member 11.

Mounted on the lower end of an upstanding or upright stem 12 slidable in and extending upwardly through a guide bore 13 in a guide member 14 fitted in an enlarged upper end portion of the transverse bore 8, the valve member 11 is the smaller lower head of a differential piston 15, a larger upper head 16 of which rides or slides in and sealingly engages a side of a pressure chamber 17 in the body 5 above the guide member.

The body 5 contains the pressure chamber 17 in an upstanding upwardly opening cylindrical boss 18 and contains the boss and closes the upper ends of the boss and chamber by a top cap 19 releasably attached to or mounted on it, as by bolting. A return spring 20 in the cap 19 and acting downwardly on the upper head 16 of the piston 15, provides a spring force for yieldably blocking dumping or discharge of water through the dump tube 9 by normally holding the valve member 11 in its seat 10.

Compressed air for operating the dump valve 2 is both introduced or injected into and bled from the valve through one of a pair of operating air ports 21 in opposite sides of the body 5 below the cap 19, the other port then being plugged. Inside the body 5 compressed air passes between the air port 21 and the pressure chamber 17 below the upper head 16 through lower and upper passages 22 and 23 and an intervening annular recess 24. The upper head 16 sufficiently larger in area than the lower, operating air applied to the dump valve 2 will lift the valve member 11 from its seat 10 when the upward force exerted by the air on the upper head 16 suffices to overbalance the downward forces of the spring 20 and hydraulic head in the cooling system on the lower head or valve member 11. Vents 25 in the cap 19 and the body 5 below the cap, respectively prevent trapping of air above the upper head 16 and leakage during cooling of water from the main bore 7 around the stem 12 to the pressure chamber 17. As previusly pointed out, instead of depending for operation in dumping plain or antifreezeless water from the cooling system on whatever pressure remains in a locomotive's compressed air system after the locomotive's engine shuts down, the assembly 1 of the present invention has its own discrete, separate, independent or individual reservoir 3. The reservoir is of a capacity to hold compressed air suffient in quantity and pressure to enable the dump valve 2 to dump completely or drain the water from the cooling system after the locomotive is shut down.

With a housing or casing 26 conveniently generally cylindrical and enclosing an air chamber, compartment or enclosure 27 of the desired capacity, the compressed air reservoir 3 has on a side for mounting on a suitable support (not shown), a plurality of spaced threaded mounting sockets 28 and at the bottom a normally plugged drain port 29. In and opening outwardly from and preferably centered laterally on opposite ends of a relatively thick top wall 30 of the housing 26, are an inlet port 31 and a recess or pocket 32 fluid-connected by a suitably cylindrical inlet passage or conduit 33 in the top wall. The inlet port 31 is connectable to the air chamber 27 through the passage 33, recess 32 and a radial port 34 in and opening downwardly from a side of the recess and is intended to be connected to the associated compressed air system for charging or supplying with compressed air while the system is operating or running. In its turn the recess 32 receives or seats a check valve 35, desirably of the cartridge type, with a spring-pressed shuttle 36 opening under pressure to pass air from the inlet port to the chamber 27 but blocking escape of air to that port when the associated system is not operating, as, in the exemplary embodiment, when the locomotive is shut down.

The air chamber 27 of the reservoir 3 being fully charged from the associated compressed air system when a locomotive is running and remaining charged when the locomotive is shut down, compressed air in the chamber is dischargeable through a vertically or upwardly directed outlet or discharge passage 37 in the top wall 30 of the housing 26. Rather than being formed directly in the top wall 30, the preferred outlet passage 37 is an axial bore of a fitting or mounting 38. Generally T-shaped in vertical cross-section, the fitting 38 has a head 39 surmounting the top wall 30 and an integral depending throat 40 extending through and screwed or threaded into an opening 41 in the wall. To avoid interference, the opening 41 in the top wall 30 is offset laterally and centered longitudinally of the passage 33. A suitably necked gasket 42 between the fitting 38 and housing 26 seals against leakage of air from the chamber 27 through the opening 41. A collar or sleeve 43 swivelly or rotatably mounted on the head 39 axially or vertically between a top flange 44 of and a snap ring 45 in the head, carries or has formed in a side thereof an outlet or discharge port 46 of the reservoir 3 and is connectable to the outlet passage 37 through radial drillings 47 bracketed by O-rings 48 sealing between the collar and the head.

The outlet passage 37 and drillings 47 open respectively upwardly and inwardly onto an upwardly opening recess or concavity 49 in the fitting 38 in which is received or seated a plunger 50 of a solenoid-actuated valve 4, such as disclosed in Frantz U.S. Pat. Nos. 2,887,126 and 4,113,451. Reciprocable in a cylindrical central aperture 51 in the valve 4 between lower and upper seats 52 and 53, respectively, for alternately closing the seats, the upper seat on energizing of the valve's coil 54 for passing or discharging operating air from the outlet port 46 of the reservoir 3, through connecting piping or tubing (not shown), to the operating air port 21 of the dump valve 2 and the lower seat for blocking discharge of air from the reservoir, while enabling any air remaining in the dump valve to vent or bleed through the vent port 55 of the solenoid valve.

No purpose would be served in dumping even a plain water coolant from the cooling system of the exemplary diesel locomotive whenever the latter was shut down, unless the ambient temperature were such as to risk freezing of the coolant. Accordingly, in the assembly 1 there is in a side of the body 5 of the dump valve 2 a normally covered compartment 56 for removably housing or seating a suitably disc-encased thermostat or thermostatic switch 57. Normally open, the switch 57 is exposed on the inside to water in main bore 7 and on the outside to ambient air. Through leads 58 to the junction box 59 of the solenoid-actuated valve 4, the thermostat 57 is there connected or wired in series in the valve's electrical power source or supply circuit 60, the latter either wired in parallel to or separate from the locomotive's main power circuit (not shown).

Adapted to close on sensing a predetermined temperature, which, for a margin of safety, preferably is somewhat above freezing and around 40 deg. F. (4.4 deg. C.), the thermostat 57 on closing enables in sequence energizing of the solenoid valve 4, supplying of operating compressed air from the reservoir 3 to the dump valve 2 and opening of the dump valve under force of the operating air sufficiently to empty or dump completely the plain or without antifreeze water coolant from the cooling system.

From the above detailed description it will be apparent that there has been provided an improved dump valve assembly which has its own reservoir connected to an associated compressed air system for charging with compressed air while the system is running and storing the air when the system is shut down, the reservoir under thermostatic control of a solenoid valve, supplying the stored compressed air to an air-operated dump valve for draining a plain water coolant from a cooling system but only when the thermostat senses a predetermined temperature.

It should be understood that the described and disclosed embodiment is merely exemplary of the invention and that all modifications are intended to be included that do not depart from the spirit of the invention and the scope of the appended claims.

Having now described my invention, I claim:

1. A dump valve assembly for dumping coolant from a cooling system, comprising an air-operated dump valve connected in said system, a reservoir discrete to said valve and having an outlet connectable to an operating air port thereof, means connecting said reservoir for charging by and against discharging to an associated compressed air system, and solenoid-actuated valve means mounted on said reservoir and interposed between said reservoir and said dump valve, said valve means being operative on demand for passing operating air from said reservoir directly to said dump valve for dumping coolant from said cooling system when said compressed air system is shut down.

2. A dump valve assembly according to claim 1, wherein the coolant is water without antifreeze, and including a thermostat connected in series in an electrical circuit of the solenoid-actuated valve, said valve being responsive in operation to sensing by said thermostat of a temperature approaching freezing.

3. A dump valve assembly according to claim 2, wherein the thermostat is removably housed in a wall of the dump valve and exposed to the temperatures of ambient air and water in said valve.

4. A dump valve assembly according to claim 1, wherein the reservoir includes an inlet port connectable to the associated compressed air system, a compressed air chamber, and a check valve interposed between said port and chamber for blocking flow from said chamber to said port.

5. In a cooling system of a diesel locomotive using as a coolant water without antifreeze, the combination of an air-operated dump valve, a compressed air reservoir discrete to said valve for supplying operating air thereto, means connecting said reservoir for charging by and against discharging to a compressed air system of said locomotive and solenoid-actuated valve means mounted on said reservoir and interposed between said reservoir and said dump valve, said valve means being operative on demand for passing operating air from said reservoir directly to said dump valve for dumping coolant from said cooling system when said compressed air system is shut down.

6. A combination according to claim 5, including a fitting on said reservoir containing an outlet passage thereof, and collar means swivelly mounted on said fitting and carrying an outlet port of said reservoir.

7. A combination according to claim 6, wherein said solenoid-actuated valve is mounted on the fitting for controlling supply of operating compressed air from said reservoir to the dump valve through said fitting and collar means.

8. A combination according to claim 7, including a thermostat housed in the drain valve and wired in series in an electrical circuit of the solenoid-actuated valve for automatically actuating the solenoid-actuated valve to supply operating air to the dump valve and dump the water coolant from the cooling system on sensing a temperature approaching freezing when an engine of the locomotive unexpectedly shuts down.

* * * * *